United States Patent
Wang et al.

(10) Patent No.: US 7,527,463 B2
(45) Date of Patent: May 5, 2009

(54) NUT AND METHOD FOR ADHESIVE NUT ATTACHMENT

(75) Inventors: Pei-Chung Wang, Troy, MI (US); John D. Fickes, Brighton, MI (US); James F. Hengel, Romeo, MI (US); Mark D. Gugel, Kelkheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 403 days.

(21) Appl. No.: 11/372,920

(22) Filed: Mar. 10, 2006

(65) Prior Publication Data

US 2007/0212188 A1 Sep. 13, 2007

(51) Int. Cl.
 *F16B 1/00* (2006.01)
(52) U.S. Cl. .................. 411/82; 411/82.2; 411/174
(58) Field of Classification Search ............ 411/82, 411/82.1, 82.2, 82.3, 82.5, 172–174, 177, 411/179, 183
See application file for complete search history.

(56) References Cited

U.S. PATENT DOCUMENTS

| 2,426,653 | A | * | 9/1947 | Whelan et al. | ............. 411/82.1 |
|---|---|---|---|---|---|
| 3,910,331 | A | * | 10/1975 | Randall | ............. 411/181 |
| 4,554,196 | A | * | 11/1985 | Meeker | ............. 428/67 |
| 4,822,224 | A | * | 4/1989 | Carl et al. | ............. 411/82.5 |
| 4,912,826 | A | * | 4/1990 | Dixon et al. | ............. 29/281.1 |
| 6,454,505 | B1 | * | 9/2002 | Griffith | ............. 411/315 |
| 6,669,428 | B2 | * | 12/2003 | Autterson et al. | ............. 411/531 |
| 6,979,159 | B2 | * | 12/2005 | Chen | ............. 411/171 |
| 7,345,247 | B2 | * | 3/2008 | Ireland | ............. 174/267 |
| 2005/0089384 | A1 | * | 4/2005 | Pratt | ............. 411/82 |

* cited by examiner

*Primary Examiner*—Gary Estremsky

(57) ABSTRACT

A nut and a method of attaching the nut to a work piece includes the nut having a top side with a threaded bore therein to receive a bolt and the nut having an underside with a skirt depending from the outer periphery thereof. A shank depends from the nut and extends into a hole in the work piece to which the nut is to be attached. A heat curable adhesive coats the shank and also coats the underside of the nut between the depending shank and the depending skirt so that upon curing of the heat curable adhesive the nut is adhesively secured to the work piece.

11 Claims, 1 Drawing Sheet

NUT AND METHOD FOR ADHESIVE NUT ATTACHMENT

FIELD OF THE INVENTION

The present invention relates to a nut that is adhesively attached to a work piece.

BACKGROUND OF THE INVENTION

It is known in the automobile and other industries that a nut can be welded to a work piece such as a metal panel. The nut has an internal thread for receiving a bolt or screw, so that a component can be attached to the work piece.

SUMMARY OF THE INVENTION

A nut and a method of attaching the nut to a work piece includes the nut having a top side with a threaded bore therein to receive a bolt and the nut having an underside with a skirt depending from the outer periphery thereof. A shank depends from the nut and extends into a hole in the work piece to which the nut is to be attached. A heat curable adhesive coats the shank and also coats the underside of the nut between the depending shank and the depending skirt so that upon curing of the heat curable adhesive the nut is adhesively secured to the work piece. Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
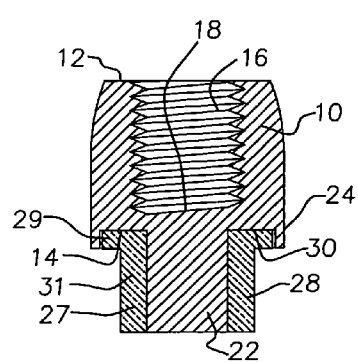
FIG. 1 is a sectional view of a nut.

Referring to FIG. 1, a nut 10 has a top side 12 and an underside 14. An internally threaded bore 16 with an end 18 is provided in the top side 12. A shank 22 depends from the center of the underside 14. A skirt 24 depends from the underside 14 at the outer periphery of the nut 10.

A heat curable adhesive 28 is provided on the shank 22 and the underside 14. As seen in FIG. 1, the adhesive 28 surrounds the shank 22 and also fills the recess 30 that is formed on the underside 14 between the shank 22 and the skirt 24. The adhesive 28 may be preformed as a ring 27 that includes a hollow sleeve portion 29 and a flange portion 31 that extends outwardly from the hollow sleeve portion 29. The ring 27 is installed onto the shank 22 so that the hollow sleeve portion 29 surrounds the shank 22 and the flange portion 31 underlies the underside 14 of the nut 10. Or the adhesive 28 may be dispensed as a liquid onto the shank 22 and the underside 14. A suitable adhesive is Betamate 1480, manufactured by Dow Chemical Co., Midland, Mich.

Figure 2:
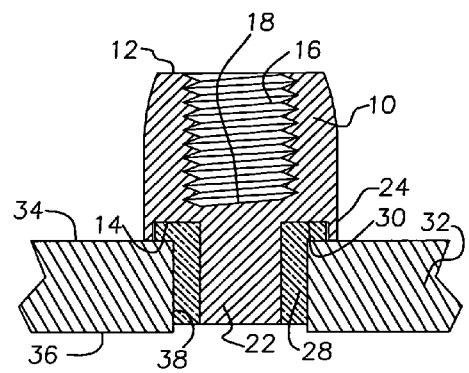
FIG. 2 is a sectional view showing the nut positioned on a work piece with a shank of the nut inserted into a hole in the work piece.

Referring to FIG. 2, a work piece 32 has an upper surface 34 and a lower surface 36. A hole 38 is drilled or punched or otherwise formed in the work piece 32. As seen in FIG. 2, the hole 38 is of a diameter to accept the shank 22 and the adhesive 28 which coats the shank 22. The skirt 24 rests upon the upper surface 34 of the work piece 32.

Figure 3:
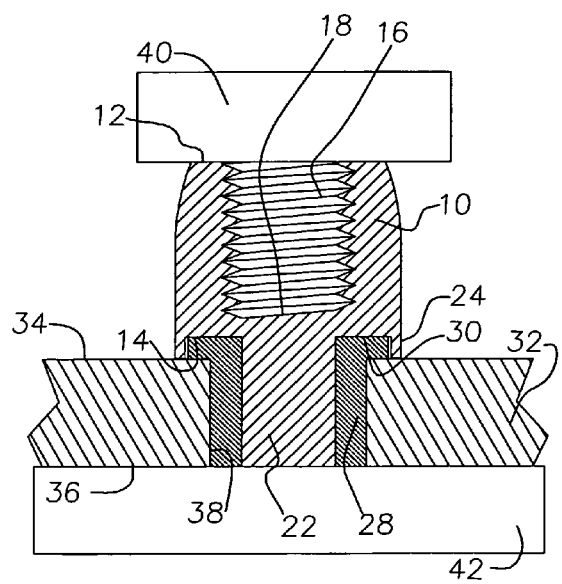
FIG. 3 shows electrodes engaging the nut and the work piece.

Referring to FIG. 3, an electrode 40 engages with the top side 12 of the nut 10 and an electrode 42 engages with the lower surface 36 of the work piece 32. The electrodes 40 and 42 may be applied to the nut 10 and the work piece 32 with pressure to assure that the skirt 24 is contacting with the upper surface 34 of the work piece 32. Electrical current is applied to the electrodes 40 and 42 at a level and for a time sufficient to heat the nut 10 and work piece 32 via electric resistance heating and thereby cause curing of the heat curable adhesive 28. Thus an adhesive bond is formed between the underside 14 of the nut 10 and the upper surface 34 of the work piece 32. An adhesive bond is also formed between the shank 22 and the walls of the work piece defining the hole 38.

Figure 4:
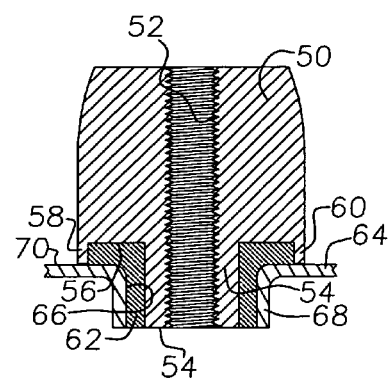
FIG. 4 is a section view showing a second embodiment of the invention.

Referring to FIG. 4, a second embodiment of the inventions is shown. In FIG. 4, nut 50 has an internally threaded bore 52 that extends all the way through the nut 50 and its shank 54. The nut 50 has an underside 56. The underside 56 has a skirt that may be in the form of projections that may be formed at spaced interval around the periphery of the underside 56, two of these projections being shown at 58 and 60. Heat curable adhesive 62 coats the shank 54 and also coats the underside 56.

The work piece 64 of FIG. 4 is a relatively thin piece of sheet metal and a hole 66 that may be provided within a boss 68 that is extruded in the sheet metal work piece 64.

As seen in FIG. 4, the nut 50 is installed by inserting the shank 54 into the extruded hole 66, with the projections 58 and 60 engaging the upper surface 70 of the sheet metal work piece 64. Electrodes, not shown, are applied to the nut 50 and the sheet metal work piece 64 to apply current and create heat so that the nut become adhesively adhered to the sheet metal work piece 64.

The foregoing description of the invention is merely exemplary in nature and, thus, variations thereof are intended to be within the scope of the invention. For example, it will be appreciated that the adhesive may be completely cured, if desired, by the application of heat via the electrodes. Alternatively, the electrodes may be used to partially cure the adhesive, and then the complete curing of the adhesive obtained when the work piece passes through a paint curing oven. The nut and the work piece are not limited to steel, but could be aluminum or other metals. In addition, the nut and work piece can be of different metals, for example the nut can be steel and the work piece aluminum, in which case the steel nut can be clad with aluminum.

What is claimed is:

1. A nut for attachment to a work piece comprising:
a nut head having a top side with threaded bore therein to receive a bolt and an underside having a skirt depending from the outer periphery thereof to engage with the work piece and space the underside of the nut head from the work piece;
a shank depending from the nut head for extending into a hole in a work piece to which the nut is to be attached;
said underside of the nut head and said skirt and said shank cooperating to define a recess for receiving an adhesive;

a heat curable adhesive filling the recess and coating the shank and coating the underside of the nut between the depending shank and the depending skirt so that upon curing of the heat curable adhesive the nut is adhesively secured to the work piece.

2. The nut of claim 1 in which the threaded bore for receiving the bolt extends through the shank.

3. The nut of claim 1 in which the threaded bore has a closed end and does not extend through the nut.

4. The nut of claim 1 in which the skirt extends continuously around the periphery of the nut.

5. The nut of claim 1 in which the skirt extends intermittently around the periphery of the nut and is provided by projections that depend from the underside of the nut at spaced intervals around the periphery of the underside of the nut.

6. The nut of claim 1 in which the heat curable adhesive is preformed as a ring that is installed onto the shank of the nut.

7. The nut of claim 1 in which the heat curable adhesive is a liquid that is dispensed onto the shank of the nut.

8. A nut for attachment to a work piece comprising:
    a nut head having a top side with threaded bore therein to receive a bolt and an underside having a skirt depending from the outer periphery thereof;
    a shank depending from the nut head for extending into a hole in a work piece to which the nut is to be attached;
    a heat curable adhesive coating the shank and coating the underside of the nut between the depending shank and the depending skirt so that upon curing of the heat curable adhesive the nut is adhesively secured to the work piece;
    said heat curable adhesive being preformed as a ring that is installed onto the shank of the nut, and said ring including a hollow sleeve portion for surrounding the shank of the nut and a flange that extends from the hollow sleeve portion to underlie the underside of nut.

9. The combination of a nut and a work piece to which the nut is to be attached, comprising:
    the nut having a top side with a threaded bore therein to receive a bolt and an underside having a skirt depending from the outer periphery thereof to engage with the workpiece and a shank depending from the center of the underside, said underside and said skirt and said shank cooperating to define a recess;
    a heat curable adhesive provided within the recess and coating the shank and also coating the underside of the nut between the depending shank and the depending skirt;
    the work piece having a hole therein of a diameter to receive the adhesive coated shank of the nut so that upon application of heat to cure the heat curable adhesive the nut is adhesively adhered to the work piece.

10. The combination of claim 9 in which the skirt of the nut is shaped to engage with the work piece when the shank is received in the hole of the work piece to thereby provide a path electrical current flow between the nut and the work piece to thereby heat and cure the heat curable adhesive.

11. The combination of claim 9 in which the work piece is a sheet metal material and the hole is an extruded hole defined by sheet metal walls that receive the shank of the nut.

* * * * *